United States Patent
Crompton et al.

(10) Patent No.: US 11,159,001 B2
(45) Date of Patent: Oct. 26, 2021

(54) CABLE SECURING DEVICE

(71) Applicant: Quick Fitting, Inc., Warwick, RI (US)

(72) Inventors: David B. Crompton, Stonington, CT (US); Libardo Ochoa Dias, West Warwick, RI (US); Herbert J. Bouchard, West Greenwich, RI (US)

(73) Assignee: Quick Fitting Holding Company, LLC, East Providence, RI (US)

( * ) Notice: Subject to any disclaimer, the term of this patent is extended or adjusted under 35 U.S.C. 154(b) by 182 days.

(21) Appl. No.: 16/667,264

(22) Filed: Oct. 29, 2019

(65) Prior Publication Data

US 2020/0067287 A1 Feb. 27, 2020

Related U.S. Application Data

(63) Continuation of application No. 16/148,727, filed on Oct. 1, 2018, now Pat. No. 10,461,514.

(60) Provisional application No. 62/569,101, filed on Oct. 6, 2017.

(51) Int. Cl.
H02G 1/00 (2006.01)
H02G 1/08 (2006.01)

(52) U.S. Cl.
CPC .................................. H02G 1/081 (2013.01)

(58) Field of Classification Search
CPC ............. H02G 1/08; H02G 1/00; H02G 1/081
See application file for complete search history.

(56) References Cited

U.S. PATENT DOCUMENTS

| 10,461,514 | B2 * | 10/2019 | Crompton | .............. | H02G 1/081 |
| 11,018,481 | B1 * | 5/2021 | Crompton | .............. | F16G 11/048 |
| 2019/0109441 | A1 * | 4/2019 | Crompton | .............. | H02G 1/081 |
| 2020/0067287 | A1 * | 2/2020 | Crompton | .............. | H02G 1/081 |

* cited by examiner

Primary Examiner — Lee D Wilson
(74) Attorney, Agent, or Firm — Williams Mullen; Thomas F. Bergert

(57) ABSTRACT

A cable securing device facilitates secure connection to a cabling end, and employs a retaining cap, a compression member, a barrel with a tapered interior wall and a fastening device.

20 Claims, 14 Drawing Sheets

Fig. 3
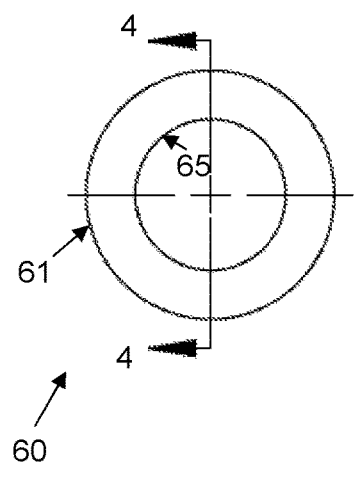
Fig. 4
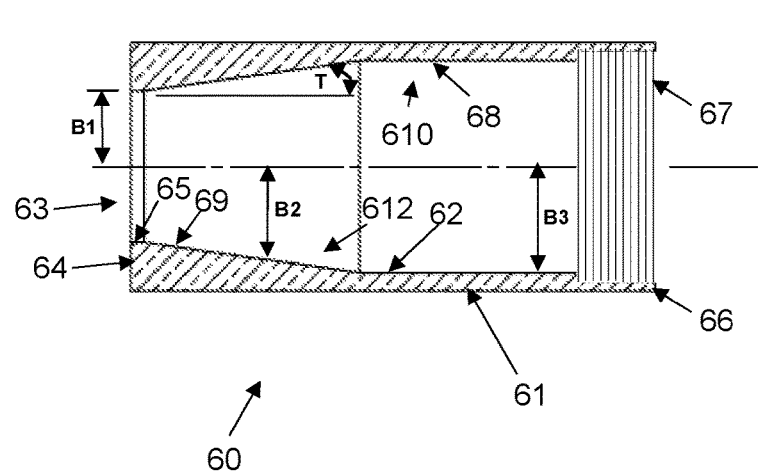
Fig. 5
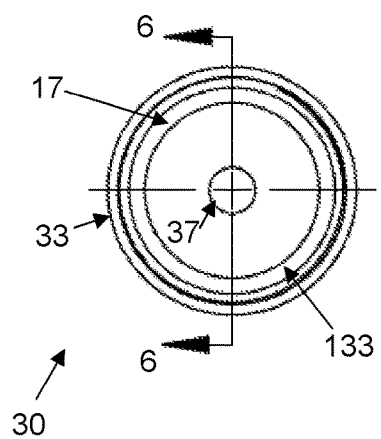
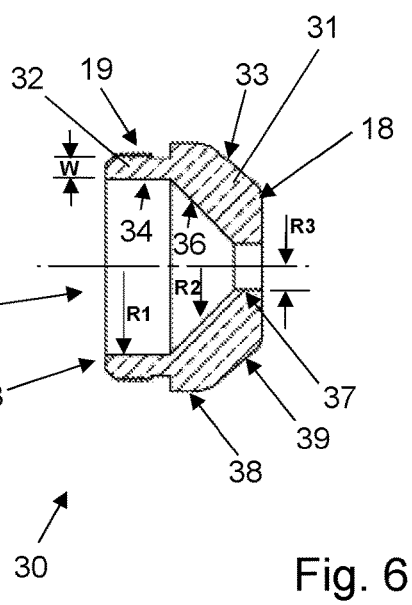
Fig. 6

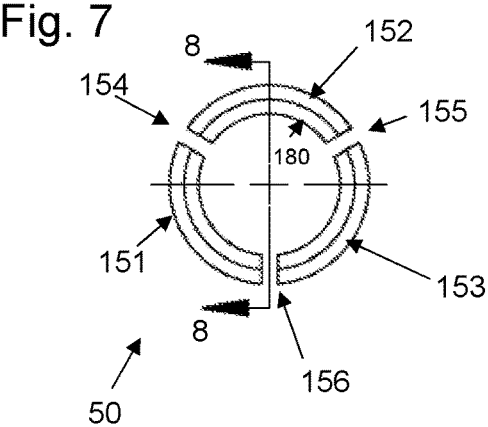
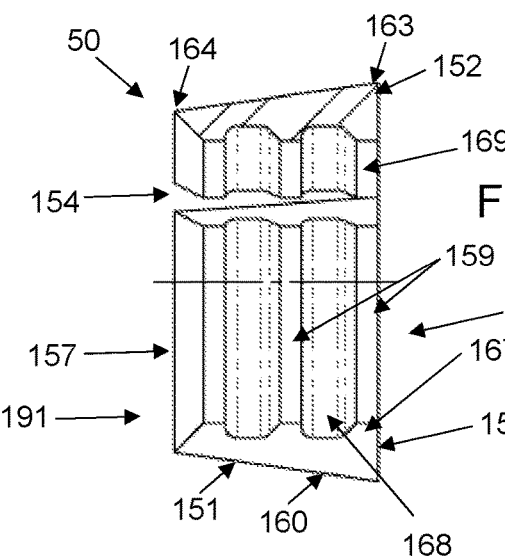
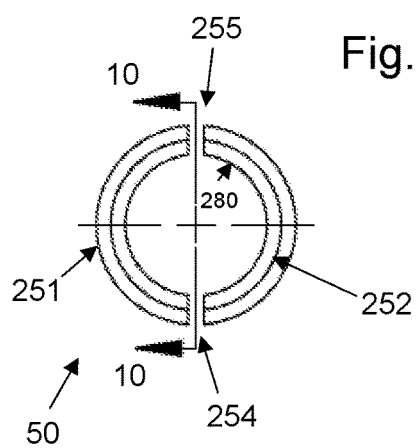
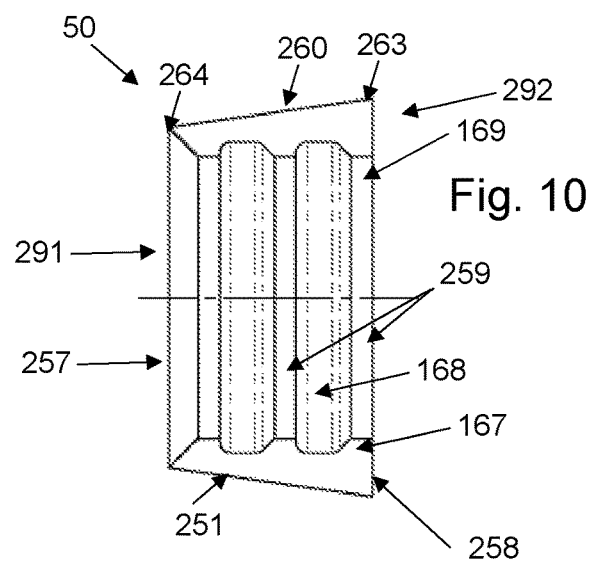
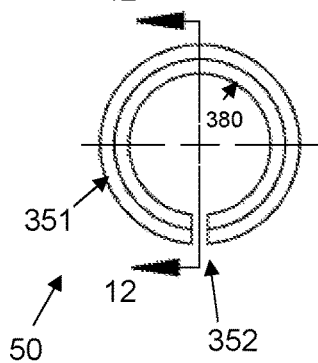
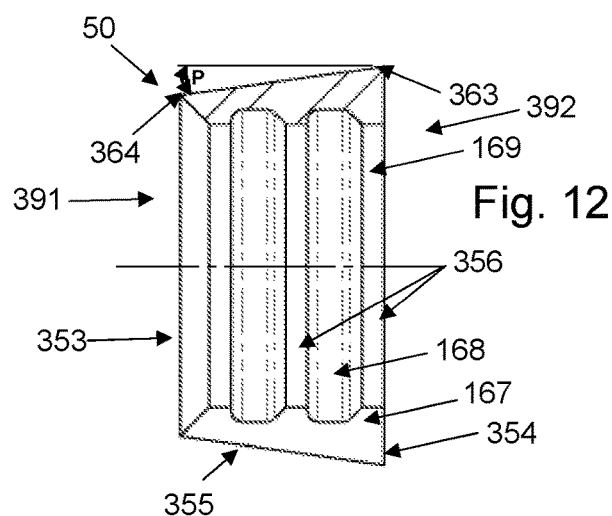

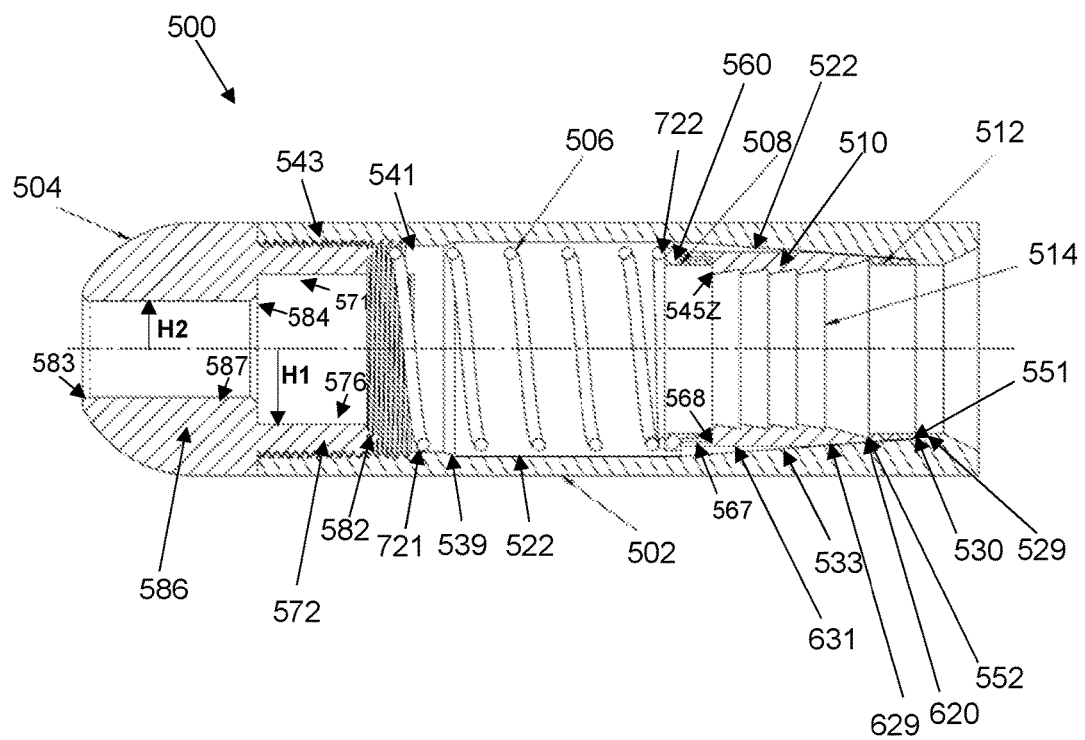
Fig. 18
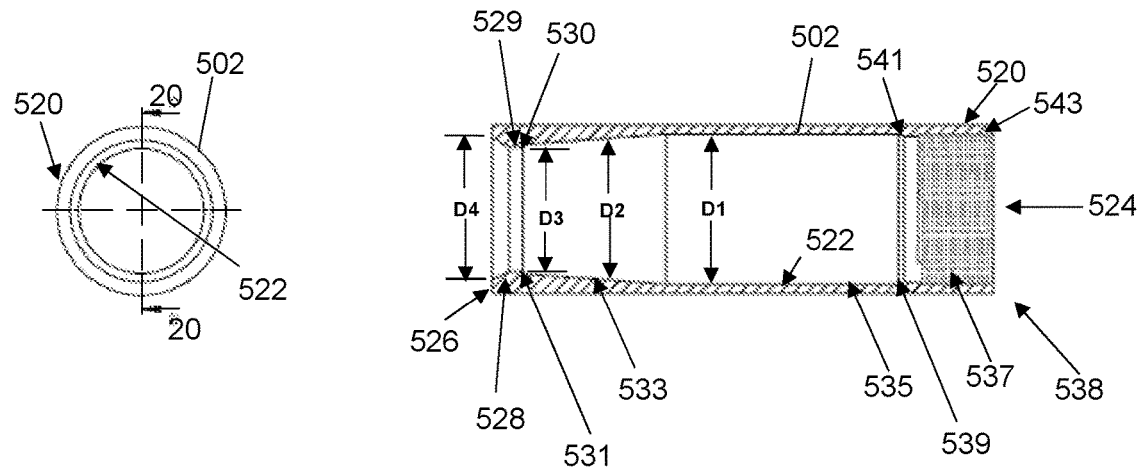
Fig. 19
Fig. 20

Fig. 32
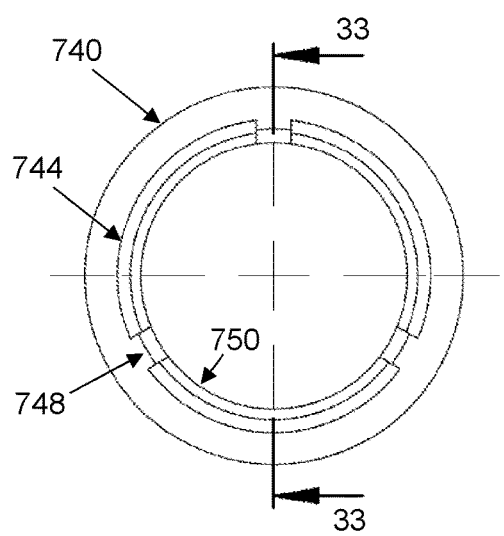
Fig. 33
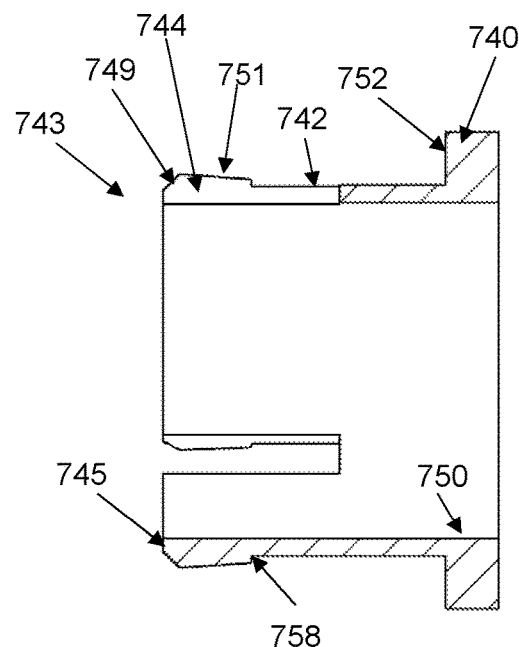
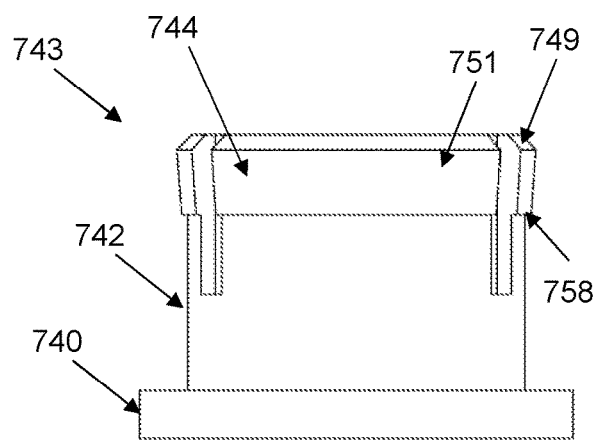
Fig. 34
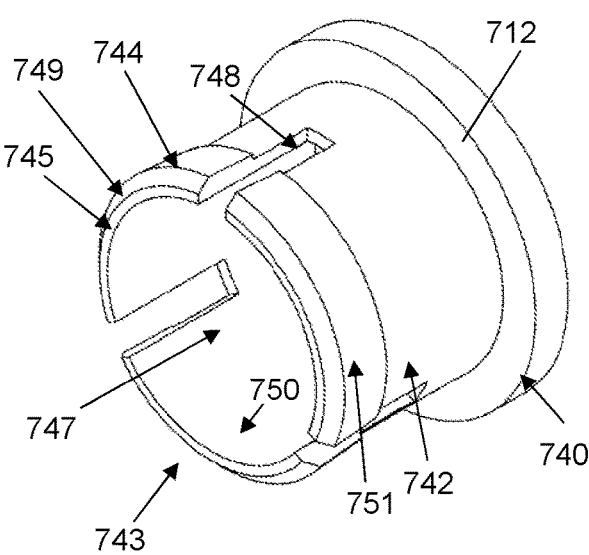
Fig. 35

Fig. 37
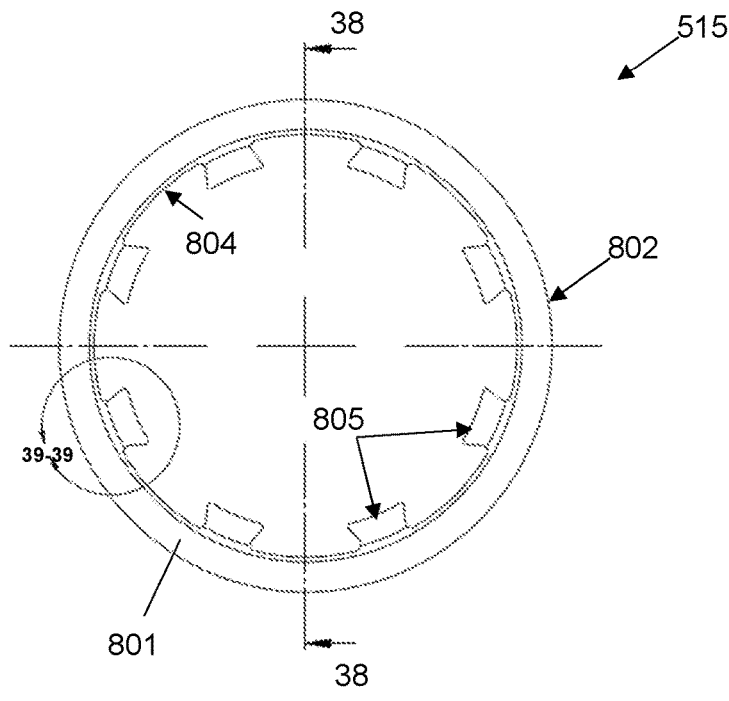
Fig. 38
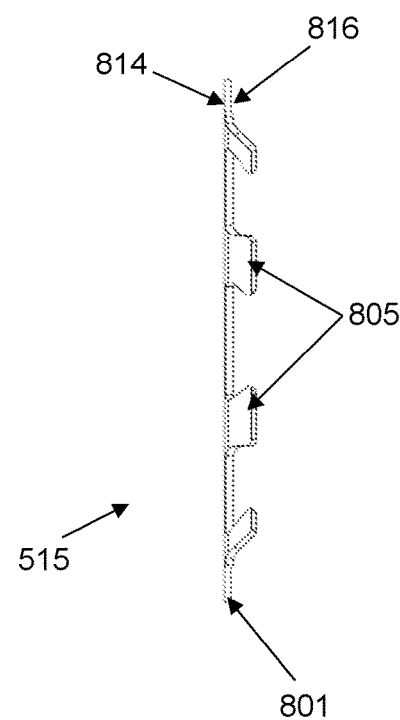
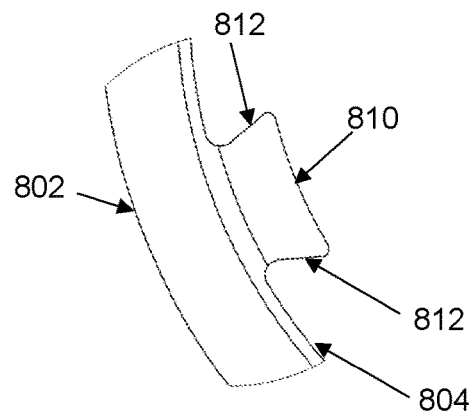
Fig. 39

CABLE SECURING DEVICE

CROSS-REFERENCE TO RELATED APPLICATIONS

The present application is a continuation of U.S. application Ser. No. 16/148,727, filed Oct. 1, 2018, now U.S. Pat. No. 10,461,514 as issued on Oct. 29, 2019, and which claims priority to U.S. provisional application No. 62/569,101, filed Oct. 6, 2017, entitled, "Push-to-Connect Cable Pulling Device, Assembly and Method", each of which is incorporated by reference herein in its entirety.

TECHNICAL FIELD

The present disclosure relates to conduit systems, and more particularly to a cable securing device that facilitates connection with a cable end and feeding or pulling the cable through a conduit.

BACKGROUND

Proper wiring and cable management in building structures is essential to the safe and effective operation of the building's electrical and cabling operation.

When wiring or cabling needs to be protected from potential damage, it can be pulled through various types of conduits. Conduits can be made of metal, rigid plastic (e.g., PVC) and other materials, and wiring or cabling can vary from very thin wires that may be bundled for passage through a conduit to very thick cables that may not be joined to any other wires or cabling when passed through a conduit. For purposes of the present disclosure, the term "cable" or "cabling" may be used throughout the present disclosure to refer to any type of wire, cable or similar elongated element that can be inserted and pulled through a conduit.

While conduit can be lengthy and provided with curves as necessitated by a building's structure, it can be difficult to pull cabling through even short lengths of conduit. Traditionally, tools such as electrician's fish tape have been used to attach to the end of the cable and pull the cable through the conduit. Generally, fish tapes are made of strong material such as steel to support pulling loads, and have a loop on one end to which the end of the cable can be secured. In instances where the cable being pulled is not insulated, or where the insulation has been stripped at the end secured to the fish tape, electrical tape may be applied to the bare segments of the cable. Other methods besides using fish tape, such as pushing or wiggling cable through conduit, for example, have been tried with generally unsatisfactory results.

Unfortunately, the fish tape method and other methods of cable pulling through conduits do not always work properly, and if the fish tape separates from the cable during the process of pulling the cable through the conduit, it can be very difficult to remove the inserted cable to re-start the process. Oftentimes in such situations, the conduit must be removed and/or broken to obtain access to the end of the cable, which can be extremely costly and time-consuming.

SUMMARY OF DISCLOSURE

The present disclosure provides, in part, a cable securing device, assembly and method that facilitates the secure connection of cabling ends for pulling the cabling through a conduit without damage to the cabling and while minimizing risk of detachment during the pulling process.

In various embodiments, the device and assembly can employ a retaining cap, a compression member, a barrel or tube with a tapered interior wall and a fastening device. The fastening device is inserted into the barrel, followed by the compression member, and these elements are capable of axial movement within the barrel along the barrel's axis. In various embodiments, the barrel can be provided with a thread at one end for securely engaging the retaining cap, and an internal taper at the other end. One end of the retaining cap has a thread for mating with the barrel's thread. The retaining cap is also formed with a central opening through which a rigid lanyard may extend. In various embodiments, a bulb segment of the rigid lanyard is retained within the interior of the retaining cap such that, as the rigid lanyard is pulled, the bulb segment engages the retaining cap and the full device with barrel, compression member and fastening device can be pulled as a unit. When a cable is inserted into the opening of the barrel opposite the lanyard, the cable pushes the fastening device and compresses the compression member back to the inner edge of the retaining cap, at which time the jaws of the fastening device are loose and fit around the cable. When the compression member expands back, it slides the back side of the fastening device back down the barrel interior towards the tapered end, forcing the jaws of the fastening device to securely engage the cable as the fastening device extends down the taper of the barrel. Once the compression member has fully expanded to the point at which the fastening device will move no further, the cable is in the secure grasp of the fastening device. At such time, a fish tape or other device can be secured to the loop in the rigid lanyard for pulling the cable through a conduit.

In various embodiments, a retaining ring is inserted between the compression member and the fastening device, and the retaining ring retains a trailing end of the fastening device while providing a mating surface for the compression member. In various embodiments, a staging clip or pusher is employed between the leading edge of the fastening device and the barrel end to prompt the jaws of the fastening device open for receiving an inserted cable, for example. The retaining ring and/or staging clip can be provided as a fracturable or sacrificial component that breaks down upon a single use, according to various embodiments. In various embodiments incorporating the retaining ring, a grip ring is provided between the retaining ring and the compression member to assist with retaining an inserted cable and maintaining alignment of the fastening device.

BRIEF DESCRIPTION OF THE DRAWINGS

FIG. 3 is a left side view of a barrel member in accordance with embodiments of the present disclosure.

FIG. 4 is a front cross-sectional view taken of the barrel member of FIG. 3 taken along line 4-4 of FIG. 3.

FIG. 5 is a left side view of a retaining cap in accordance with embodiments of the present disclosure.

FIG. 6 is a front cross-sectional view of the retaining cap of FIG. 5 taken along the line 6-6 of FIG. 5.

FIG. 7 is a left side view of a fastening device in accordance with embodiments of the present disclosure.

FIG. 8 is a front cross-sectional view of the device of FIG. 7 taken along the line 8-8 of FIG.

FIG. 9 is a left side view of an alternative fastening device in accordance with embodiments of the present disclosure.

FIG. 10 is a front cross-sectional view of the device of FIG. 9 taken along the line 10-10 of FIG. 9.

FIG. 11 is a left side view of another alternative fastening device in accordance with embodiments of the present disclosure.

FIG. 12 is a front cross-sectional view of the device of FIG. 11 taken along the line 12-12 of FIG. 1.

FIG. 18 is a front cross-sectional view of an assembled embodiment of the device of FIG. 17.

FIG. 19 is a left side view of the barrel member of the device of FIG. 17.

FIG. 20 is a front cross-sectional view of the barrel member taken along line 20-20 of FIG. 19.

FIG. 32 is a front view of an embodiment of a pusher member in accordance with the present disclosure.

FIG. 33 is a side cross-sectional view of the pusher member taken along line 33-33 of FIG. 32.

FIG. 34 is a bottom view of the pusher member of FIG. 32.

FIG. 35 is a perspective view of the pusher member of FIG. 32.

FIG. 37 is a front view of an embodiment of a grip ring member in accordance with the present disclosure.

FIG. 38 is a side cross-sectional view of the grip ring member taken along line 38-38 of FIG. 32.

FIG. 39 is an enlarged view of encircled portion 39-39 of FIG. 37.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

It will be appreciated that reference to "a", "an" or other indefinite article in the present disclosure encompasses one or more than one of the described element. Thus, for example, reference to a fastening device may encompass one or more fastening devices, and so forth.

Figure 1:
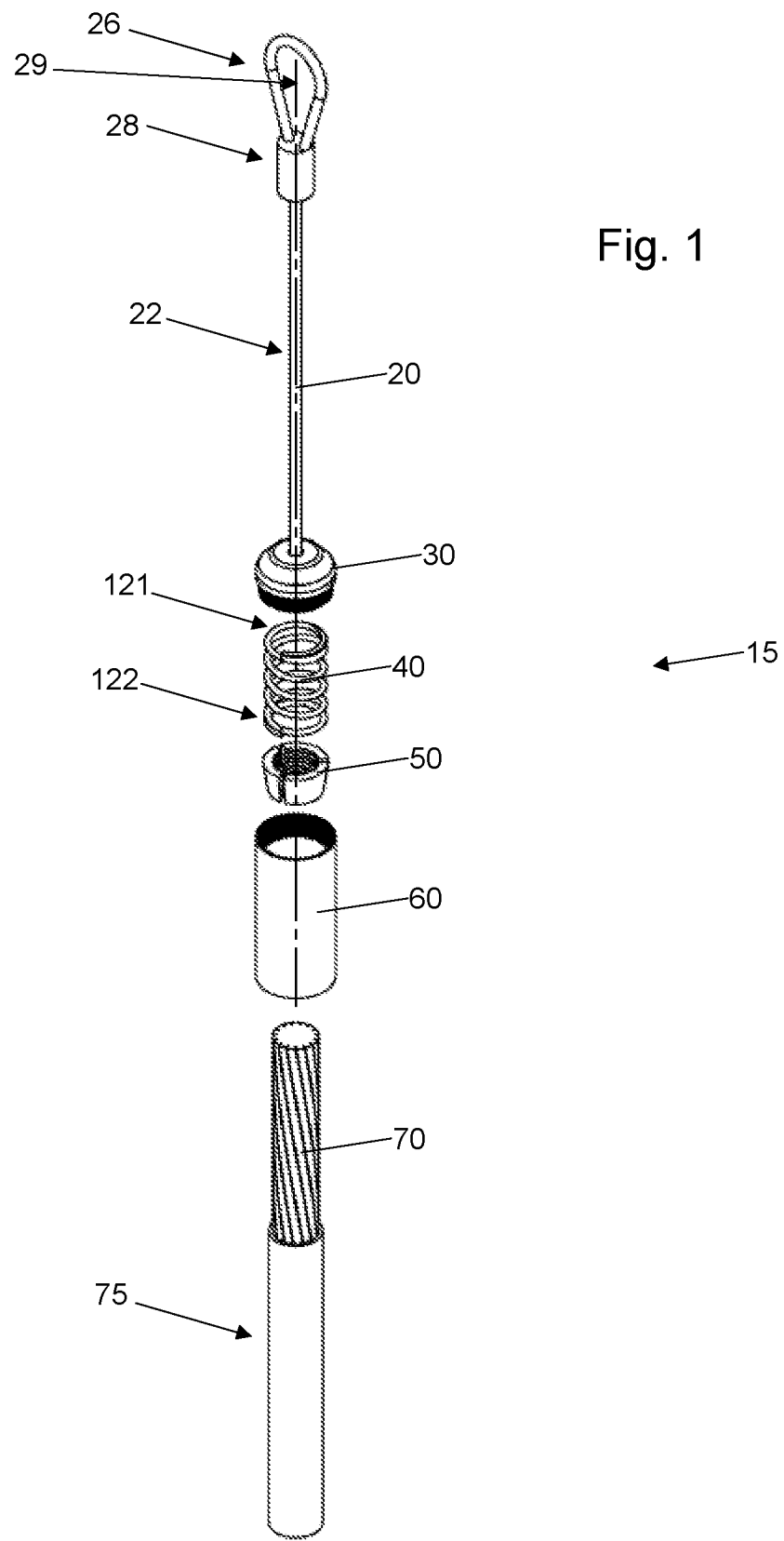
FIG. 1 is an exploded front perspective view of one embodiment of a cable securing device in accordance with the present disclosure, shown with a cable to be inserted.
Figure 2:
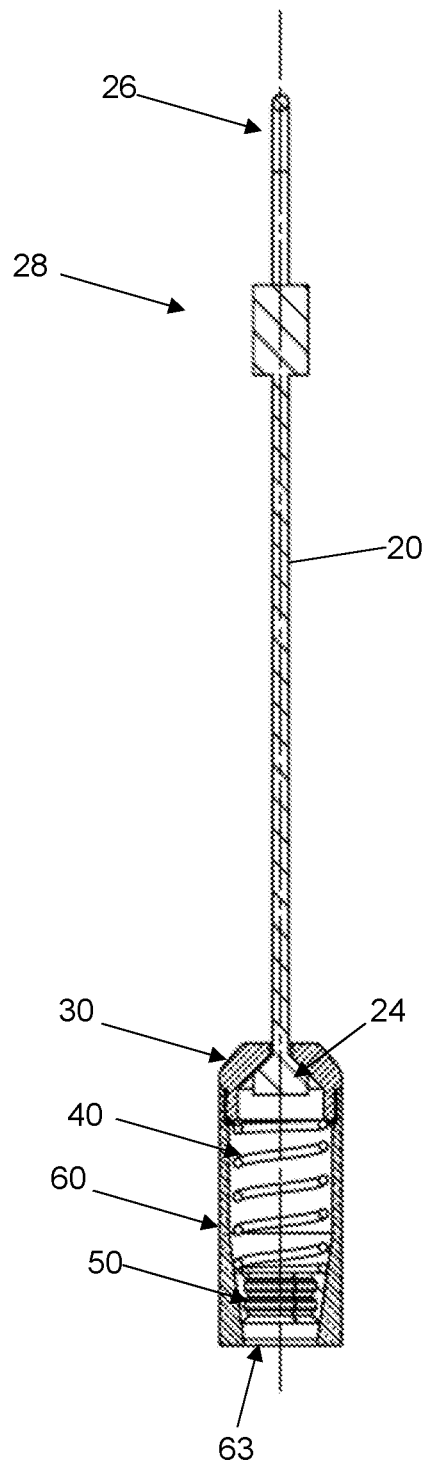
FIG. 2 is a front cross-sectional view of the device of FIG. 1, without the cable.

In the cable securing device 15 according to embodiments of the present disclosure as shown in FIGS. 1 and 2, elements as shown include: a retaining cap 30, a compression member 40, a fastening device 50 and a barrel 60. A cable 70 with insulation 75 is also shown; however, the cable is not necessarily considered an element of the device and assembly as presently disclosed.

Figure 13:
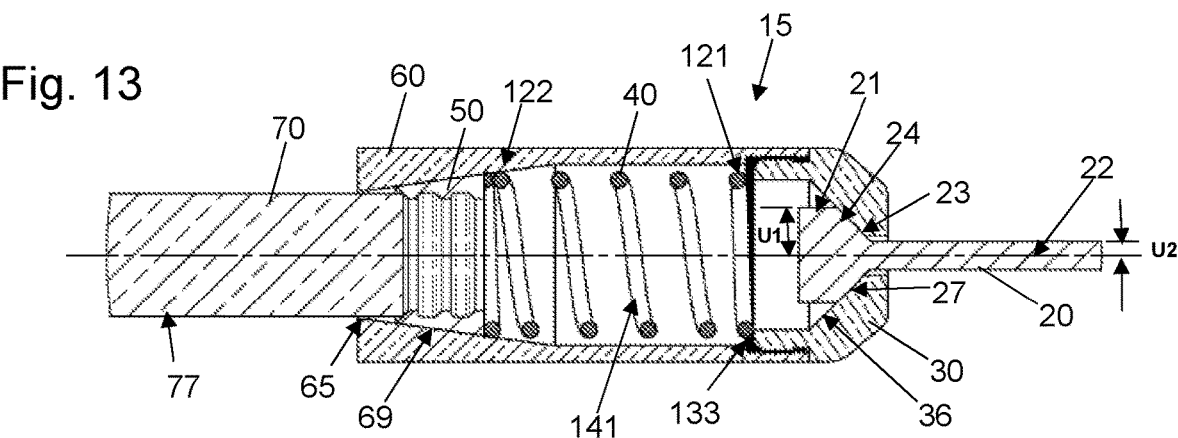
FIGS. 13-16 are cross-sectional views showing different stages of securing a cable within embodiments of the device of the present disclosure.

As shown in FIGS. 1 through 16, a lanyard 20 is provided with a body segment 22, bulb segment 24 and end loop attachment 26. The lanyard 20 may or may not be considered part of the cable securing device 15 depending upon the nature of the embodiments of the present disclosure. In various embodiments, the bulb segment 24 is integrally formed with the body segment 22 so as to provide a monolithic structure, and the end loop attachment 26 has a base segment 28 that is crimped or otherwise effectively secured to the body segment 22. As shown in FIG. 13, the bulb segment 24 further has a base portion 21 and a generally frustoconical head portion 23 formed with the body segment 22. The base portion 21 has a radius U1 that is greater than radius U2 of the body segment 22. The head portion 23 has a variable radius extending from the base portion 21 to the body segment 22. As further shown in FIG. 13, the outer surface 27 of the head portion 23 engages an angled interior surface 36 of the head segment 31 (see FIG. 6) of the retaining cap 30. This facilitates a secure engagement such that when the lanyard 20 is pulled, it will pull the barrel 60 and its contents during operation. As shown in FIG. 1, the loop attachment 26 is formed with an opening 29 therein, which facilitates the secure connection of a fish tape or other external device having a latch or other mechanism securable to the loop attachment 26 for pulling, as described in more detail hereafter. In various embodiments, the lanyard can be made of steel or other rigid material.

Figure 14:
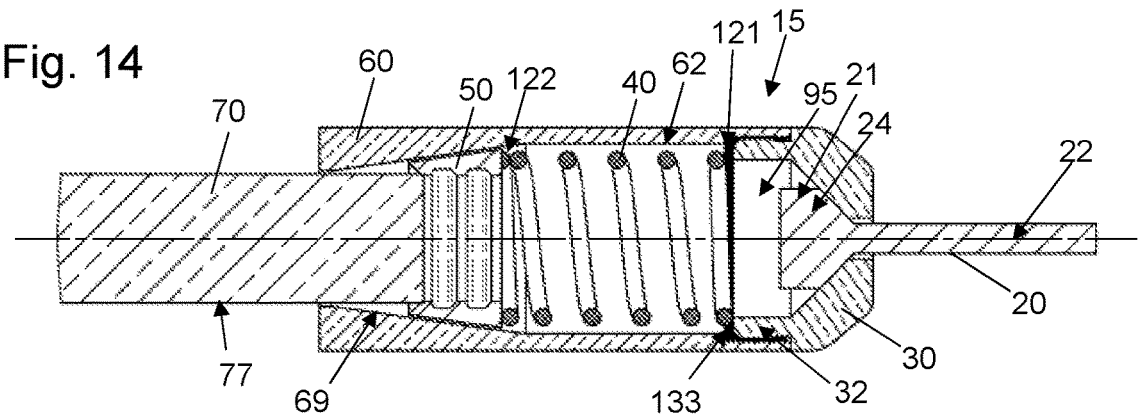

As shown in FIGS. 5 and 6, the retaining cap 30 can be formed with a head segment 31, an axially extending body segment 32, an outer surface 33 and an inner surface 34 defining a bore hole 35 extending axially therethrough. The outer surface 33 of the body segment 32 can be provided with a threaded exterior as at 19, although in alternative embodiments, the body segment inner surface 34 can be provided in threaded form. It will be appreciated that body segment 32 is formed with a radially extending edge 133 having a width W such that the radially extending edge 133 extends radially inwardly of the barrel interior surface 62 when connected, as shown in FIG. 14, which permits the radially extending edge 133 of the body segment 32 to provide resisting force to compression member 40 during operation. The head segment 31 has an outer radial edge surface 38, a shoulder edge surface 39 and a top edge surface 18. The inner surface 34 can be formed such that it does not have a constant radius, but rather has a radius R1 associated with body segment 32, a radius R2 associated with the angled interior surface 36 of the head segment 31 and a radius R3 associated with the lanyard body receiving segment 37 of the head segment 31. In various embodiments, radius R1 is constant and is generally larger than radius R2, which is variable and reduces in size as it extends from the body segment 32 to the lanyard body receiving segment 37. Both radius R1 and radius R2 are larger than radius R3, which is constant in the embodiment shown in FIGS. 5 and 6. The surfaces 36, 37 of different radii R2, R3, respectively, provide mating surfaces for the outer surfaces of the lanyard body segment 22 and lanyard bulb segment 24, as shown in FIGS. 13-16. In various embodiments, such as shown in FIG. 14, for example, the base portion 21 of the bulb segment 24 extends radially into the interior cavity 95 defined by the body segment 32 of the retaining cap 30, for example. In so doing, the base portion 21 of the bulb segment 24 acts as a stopper when a cable 70 is inserted, which prevents the cable 70 from being pinched or otherwise deformed if it were to extend further into the bore hole 35 of the retaining cap 30. In various embodiments, the compression member internal radius and the radius of the base portion 21 of the bulb segment 24 at the interior cavity 95 are substantially the same. In various embodiments, the retaining cap 30 is made of steel or other rigid material.

The compression member 40 can be a compression spring capable of expansion and retraction, biased to return to a resting position as appropriate for the functions described herein. In various embodiments, the compression member 40 is formed of steel or other suitable material. In various other embodiments, compression member 40 is formed as a suitably resilient and tubular-shaped elastomeric membrane or foam material for operation in accordance with the present disclosure. The compression member 40 is shown in FIGS. 1 and 13 through 16 with a first end 121 and a second end 122. In implementations where very low force is required, the elastomeric membrane can provide lower resistance than a compression spring, for example. An exemplary embodiment illustrating elastomeric membrane as the compression member is shown at 506 in FIG. 21, for example.

As shown in FIGS. 3 and 4, embodiments of the barrel 60 can be formed as a monolithic, integrated component with an exterior surface 61 and an interior surface 62 defining an interior cavity 63 extending axially therethrough. The exterior surface 61 can be substantially cylindrical, or tubular, as shown. A first end surface 64 extends radially inwardly from the exterior surface 61 to an axially extending inner radial lip 65 having a radius B1. A second end surface 66 of the barrel 60 extends radially inwardly from the exterior surface 61 to an interior thread 67. The interior surface 62 tapers from a widest radius B3 at segment 68 to a tapering segment 69 having a variable radius B2, down to the axially extending inner radial lip 65. The barrel interior surface 62 thus has a substantially cylindrical portion 610 and a substantially frustoconical portion 612, with the substantially frustoconical portion 612 shown at tapering segment 69. In various embodiments, radius B3 is constant and is larger than radius B2, and both radius B3 and B2 are larger than radius B1. The tapered interior surface 62 of barrel 60 facilitates the operation of the compression member 40 and fastening device 50 as described in more detail hereafter. In various embodiments, the taper angle T is constant and can range from approximately ten degrees to approximately thirty degrees, depending upon the implementation. For example, in situations where a shorter barrel 60 is required, angle T may be higher. In various embodiments, the barrel 60 is formed of steel or other rigid material.

As shown in FIGS. 7 through 12, the fastening device 50 can be provided in various forms. In FIGS. 7 and 8, for example, the fastening device 50 is provided as a three-piece device with first 151, second 152 and third 153 members aligned with respective gaps 154, 155 and 156 therebetween. Each of the members 151, 152 and 153 is provided with a respective leading edge 157 at a first axial end 191, a trailing edge 158 at a second axial end 192, a radially outer surface 160 and a radially interior surface 180 with a gripping segment such as teeth 159. As shown in FIGS. 9 and 10, the fastening device can provided as a two-piece device with first 251 and second 252 members aligned with respective gaps 254 and 255 therebetween. The members 251, 252 are provided with a leading edge 257 at a first axial end 291, a trailing edge 258 at a second axial end 292, a radially outer surface 260 and a radially interior surface 280 with a gripping segment such as teeth 259. As shown in FIGS. 11 and 12, the fastening device is provided as a single piece, monolithic device with body 351 formed with a gap or split 352. The body 351 is formed with a leading edge 353 at a first axial end 391, a trailing edge 354 at a second axial end 392, a radially outer surface 355 and a radially interior surface 380 with a gripping segment such as teeth 356. Radially outer surfaces 160, 260 and 355 extend radially inwardly and axially outwardly from an axially inner edge (163 in FIG. 8, 263 in FIG. 10 and 363 in FIG. 12) to an axially outer edge (164 in FIG. 8, 264 in FIG. 10 and 364 in FIG. 12). In various embodiments, the radially outer surfaces 160, 260 and 355 extend at an angle P (illustrated in FIG. 12 for example) so as to mate in sliding engagement with the substantially frustoconical portion 612 (i.e., the tapered internal surface 69) of the interior surface of the barrel 60 during operation. It will be appreciated that the sliding engagement of this embodiment of the fastening device 50 with the barrel interior surface 62 is such that the axially inner edge of the radially outer surface of the fastening device 50 maintains contact with the barrel interior surface 62 throughout the sliding engagement, while the axially outer edge (164 in FIG. 8, 264 in FIG. 10 and 364 in FIG. 12) of the radially outer surface (160 in FIG. 8, 260 in FIG. 10 and 355 in FIG. 12) of the fastening device 50 only maintains contact with the tapered portion 69 for a portion of the sliding engagement of the axially outer edge with the frustoconical portion 612 of the barrel interior surface 62. In various embodiments, the fastening device 50 is formed of steel or other rigid material.

As shown in FIGS. 8, 10 and 12, the teeth 159, 259 and 356 of fastening device 50 are formed as radially inwardly extending ridges 167 rising from the internal surface floor 168 of the fastening device. In various embodiments, each ridge 167 has a beveled peak 169 as opposed to a sharpened peak, which assists in providing sufficient surface area for engaging an inserted cable 70. In other embodiments, a sharpened peak is provided for greater pinching ability.

FIGS. 13 through 16 illustrate different stages of operation of the device and assembly of the present disclosure. Prior to insertion of a cable 70, the device 15 is loaded such that the fastening device 50 and compression member 40 are inserted into the barrel 60. The fastening device 50 may be in the form of a single piece member, two members or three members as noted above in the description pertaining to FIGS. 7 through 12. The compression member 40 is inserted such that the compression member second end 122 engages the trailing edge 158, 258 and/or 354 of the fastening device 50. Next, the lanyard 20 with retaining cap 30 secured around the bulb 24 of the lanyard 20, is threadedly engaged with the barrel 60 such that the radially extending edge 133 of the retaining cap 30 engages the first end 121 of the compression member 40. The lanyard body 22 is securely positioned within the retaining cap 30. While FIGS. 4, 6 and 13-16 show retaining cap 30 with an external thread 19 and barrel 60 with internal thread 67, it will be appreciated that the retaining cap 30 can be provided with an internal thread for mating with an external thread on the barrel 60.

As shown in FIG. 13, and during operation, a cable 70 is inserted into the opening of the barrel 60 where the axially extending inner radial lip 65 resides and when the compression member is in an expanded position 141. Sliding past the lip 65, the cable 70 extends through the leading edge(s) (157 in FIG. 8, 257 in FIG. 10 and 353 in FIG. 12) of the fastening device 50. Depending upon the embodiment of the fastening device 50, the leading edge represents the leading edge of either one, two or three fastening device members (see FIGS. 7 through 12). The leading edge is thus not in contact with the barrel interior surface during operation, although the trailing edge of the fastening device 50 is in mating contact with the compression member second end 122, as shown in FIGS. 13 through 16. Further, the axially inner edge (e.g., 163, 263, 363 in FIGS. 7 through 12) of the radially outer surface (e.g., 160, 260, 355 in FIGS. 7 through 12) of the fastening device 50 maintains contact with the barrel interior surface 62 throughout the sliding engagement therewith. However, the axially outer edge (e.g., 164, 264, 364) of the radially outer surface (e.g., 160, 260, 355) of the fastening device 50 does not maintain contact with segment 62 of the barrel interior surface throughout the fastening device's sliding engagement therewith. Nonetheless, this engagement does not disrupt the evenness through which the fastening device 50 slidingly engages the barrel interior surface 62, as the pressure from the inserted cable 70 against the teeth (e.g., 159, 259, 356) does not permit the fastening device 50 to move radially inwardly, which thus maintains suitable pressure and active sliding engagement of the axially inner edge of the radially outer surface with the barrel interior surface 62. In this way, the teeth of the fastening device 50 maintain engagement with the inserted cable 70 while permitting the cable 70 to pass through.

Figure 15:
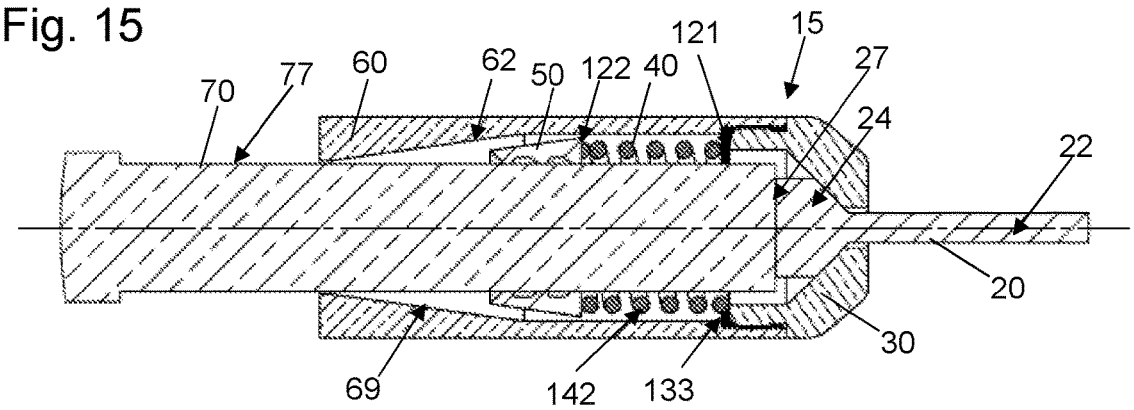
Figure 16:
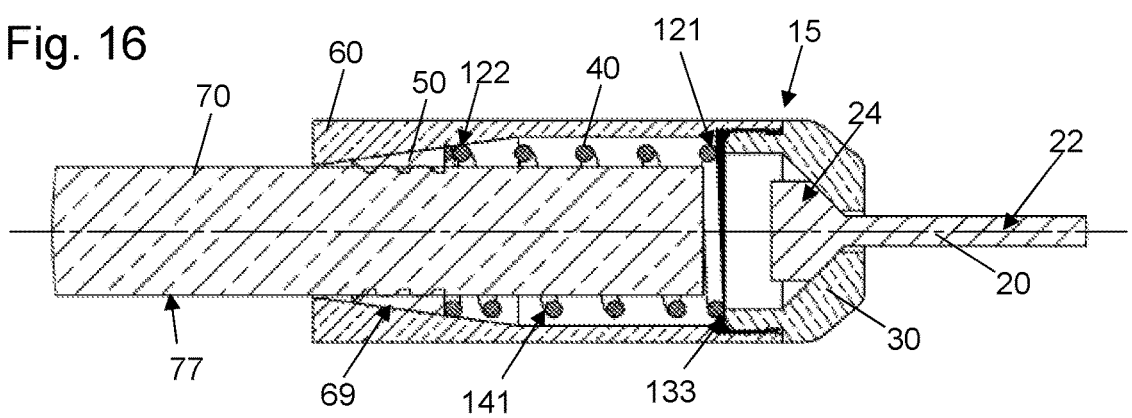

As shown in FIG. 14, as the cable 70 is pushed further into the barrel 60, it pushes fastening device 50 axially within the barrel interior cavity (63 in FIG. 4) and along the interior surface 69 of the barrel 60, causing the compression member 40 to compress towards a compressed position at the same time that the teeth (e.g., 159, 259, 356) of the fastening device are opening. As shown in FIG. 15, once cable 70 is fully inserted, it engages the bottom end 27 of the bulb 24 of the lanyard 20 and the compression member 40 is fully or nearly fully in a compressed position 142. As the compression member 40 begins to expand, it pushes the fastening device 50 along the outer surface 77 of the cable 70, and the teeth of the fastening device 50 begin to clamp down on the cable 70 as the fastening device 50 is pushed back into the tapered interior surface 69 of the barrel. The expansion of the compression member 40 back to an expanded position 141 thus forces the teeth of the fastening device 50 to continue digging into the outer surface 77 of the cable 70 until the fastening device 50 can extend no further, as shown in FIG. 16. At such time, a fish tape or other device can be secured to the loop 26 in the rigid lanyard 15 for pulling the cable 70 through a conduit.

It will thus be appreciated that the compression member 40 is compressible into the compressed position 142 (see FIG. 15) by the radially extending edge 133 of the retaining cap body segment 32 at the compression member first end 121 and by the trailing edge of the fastening device 50 at the compression member second end 122. The even surfaces of the retaining cap body segment 32 and trailing edge of the fastening device 50 provide for consistent force and/or resistance as the compression member 40 compresses and expands during operation. Additionally, as the retaining cap body segment 32 extends radially inwardly of the barrel interior surface 62 when connected, it firmly secures the internal components 40, 50 in place within the interior of the device 15, while allowing for simple disassembly when the retaining cap 30 is removed. It will be appreciated that the fastening device 50 is slidingly engaged with the interior surface 69 at substantially frustoconical portion 612 when the compression member 40 is in the expanded position 141, as shown in FIGS. 13 and 16.

FIGS. 17 through 35 illustrate alternative embodiments of the cable securing device of the present disclosure. In the device assembly 500 according to embodiments of the present disclosure as shown in FIGS. 17 through 26, elements of the assembly as shown include: a barrel 502, a retaining cap 504, a compression member 506, a retainer 508, a fastening device 510 with teeth 514 and a staging clip 512. In the embodiment shown in FIGS. 30-35, a pusher 712 is employed instead of staging clip 512.

As shown in FIGS. 17 through 20, the barrel 502 can be formed as a monolithic, integrated component with an exterior surface 520 and an interior surface 522 defining an interior cavity 524 extending axially therethrough. The exterior surface 520 can be substantially cylindrical and/or tubular, as shown. A first end surface 526 extends radially inwardly from the exterior surface 520 to an axially and radially extending inner radial lip 528 having a variable diameter D4 that is widest at the first end surface 526. The inner radial lip 528 extends axially inwardly to an axially extending inner platform 529 having a diameter D3. Diameter D4 is larger than diameter D3, which facilitates ease of insertion of a cable or similar element as described elsewhere herein. The inner platform 529 is formed with a radially outwardly extending edge 530 on the axially inner side 531 of the inner platform 529, wherein the radially outwardly extending edge 530 assists in retaining staging clip 516 in the assembly as described elsewhere herein. The interior surface 522 has a tapered wall segment 533 extending from the radially outwardly extending edge 530 to non-tapered wall segment 535. In various embodiments, the tapered wall segment 533 has a diameter D2 that extends from a narrowest point adjacent radially outwardly extending edge 530 to a widest point adjacent non-tapered wall segment 535. The non-tapered wall segment 535 has a consistent diameter D1 and has a threaded portion 537 at a second axially outer end 538 that is opposite the first end surface 526.

The barrel interior surface 522 thus has a first substantially cylindrical portion at non-tapered wall segment 535, a first substantially frustoconical portion at tapered wall segment 533, a second substantially cylindrical portion inner platform 529, and a second substantially frustoconical portion at the radially extending inner radial lip 528. In various embodiments, diameter D1 is constant and is larger than diameters D2, D3 and D4. In various embodiments, the non-tapered wall segment 535 is formed with a radially inwardly extending step 539 at the axially inward end 541 of the threaded portion 537 of the barrel 502. The radially inwardly extending step 539 can provide a supporting surface for the compression member 506 as described elsewhere herein, while also providing a wider and/or thicker wall segment 543 to assist with pulling support when a lanyard is secured to the threaded portion 537 of the barrel 502. The interior tapered wall segment 533 of barrel 502 facilitates the operation of the compression member 506 and fastening device 510 as described in more detail hereafter. In various embodiments, the taper angle of interior tapered wall segment 533 is similar to taper angle T as described in connection with FIG. 4 above.

Figure 17:
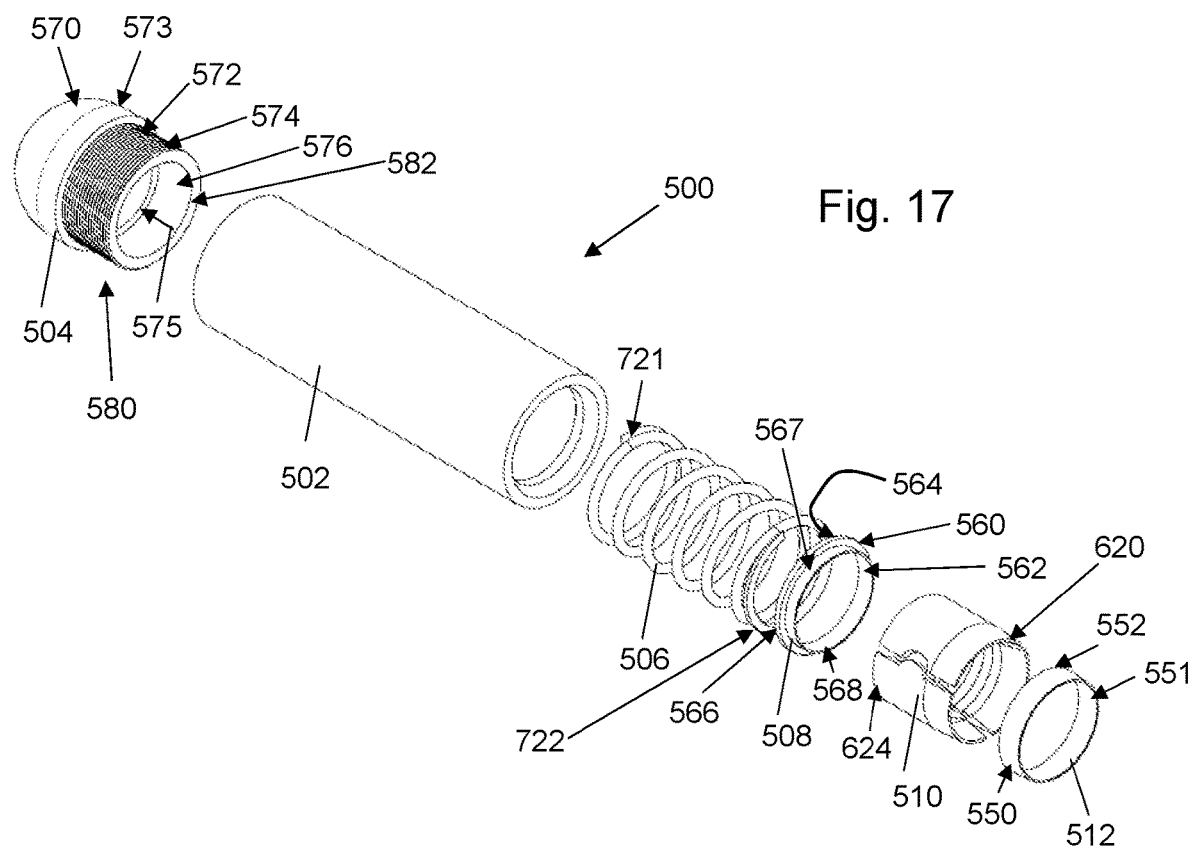
FIG. 17 is an exploded front perspective view of another embodiment of a cable securing device in accordance with the present disclosure.

As shown in FIGS. 17 and 18, the retaining cap 504 is formed with a head segment 570, an axially extending body segment 572 having a radially extending edge 582, an outer surface 574 and an inner surface 576 defining a bore hole 575 extending axially therethrough. The outer surface 574 of the body segment 572 can be provided with a threaded exterior as at 580 for securing the retaining cap 504 to the threaded portion 537 of the barrel 502, although it will be appreciated that the retaining cap 504 can be provided with a threaded interior in an alternative embodiment. The head segment 570 has an outer radial edge surface 573. It will be appreciated that the body segment 572 can be formed similar to body segment 32 in FIG. 6, with a width that allows body segment 572 to extend radially inwardly of the barrel interior surface 522 when connected, as shown in FIG. 18, which permits body segment 572 to provide resisting force to compression member 506 during operation.

As shown in the embodiment in FIG. 18, the inner surface 576 of retaining cap 504 does not have a constant radius, but rather has a radius H1 associated with body segment inner surface 571, and a smaller radius 112 associated with a lanyard body receiving segment 586 of the head segment 570. In various embodiments, radius H1 and radius H2 are constant. In various embodiments, as shown in FIG. 17, the body receiving segment 586 has an inner surface 587 that is fluted at ends 583, 584, which can assist with manipulation of a lanyard body segment, for example, during a pulling operation. The surfaces 571, 587 of different radii H1, 112, respectively, provide mating surfaces for the outer surfaces of the lanyard segments, as described elsewhere herein in connection with various embodiments of the disclosure. In various embodiments, the retaining cap 504 is made of steel or other rigid material. In the embodiment in FIG. 21, inner surface 576 of retaining cap 504 has a substantially constant radius H3 associated with body segment inner surface 571, and a tapered interior surface 589 associated with the lanyard body receiving segment of the head segment of the retaining cap. As further shown in FIG. 21, the tapered interior surface 589 can facilitate operation with a lanyard 590 having a rounded head 592, for example.

Figure 21:
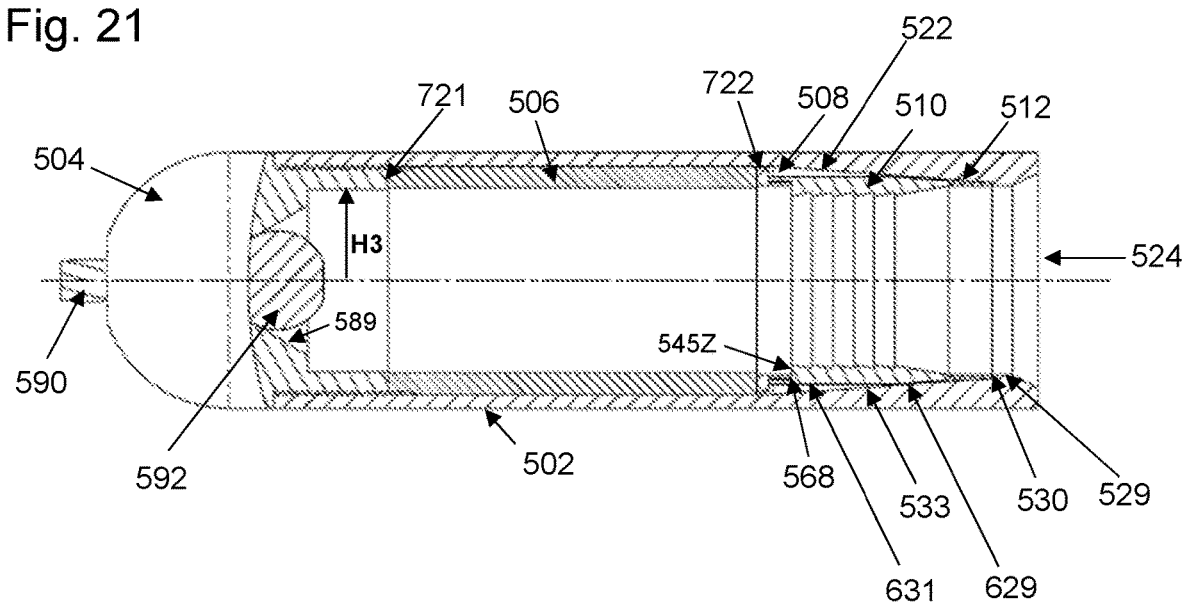
FIG. 21 is a front cross-sectional view of an assembled alternative embodiment of the device according to the present disclosure.

The compression member 506 can be a compression spring (see FIGS. 17 and 18) or a cylindrical or tubular shaped elastomeric membrane (see FIG. 21) as described above. The compression member 506 is capable of expansion and retraction, and can be biased to return to an expanded position as appropriate for the functions described herein. The compression member 506 is shown in FIGS. 17, 18, 21 and 27 through 29 with a first end 721 and a second end 722. In various embodiments where the compression member 506 is a spring, it is formed of spring steel or other suitable material. An exemplary embodiment of employing elastomeric membrane as compression member 506 is shown in FIG. 21.

As shown in FIGS. 17, 18 and 22 through 26, the fastening device 510 can be provided as a three-piece device with first 601, second 602 and third 603 members aligned by edge extensions 605 and edge notches 607 formed therein. In various embodiments, an edge extension 605 is integrally formed extending outwardly and with a convex shape on a first side edge 609 of each member 601, 602, 603 and an edge notch 607 is formed extending inwardly and with a concave shape on a second side edge 611 of each member 601, 602, 603 such that each edge notch 607 of a respective member mates with a corresponding edge extension 605 of an adjoining member. Each of the members 601, 602 and 603 is provided with a respective leading edge 620 at a first axial end 622, a trailing edge 624 at a second axial end 626, a radially outer surface 628 and a radially interior surface 480 with a gripping segment such as teeth 514. As shown in FIGS. 22 through 26, the leading edge 620 and trailing edge 624 can be provided with thin wall-type surfaces for engaging the staging clip 512 and retainer 508, respectively. In operation, the edge extension 605 and edge notch 607 of adjacent fastening device members (e.g., 602 and 603 in FIG. 22) engage within the barrel interior cavity and restrict axial sliding and misalignment during operation. In various embodiments, the fastening device 510 is formed of steel or other rigid material.

Figure 22:
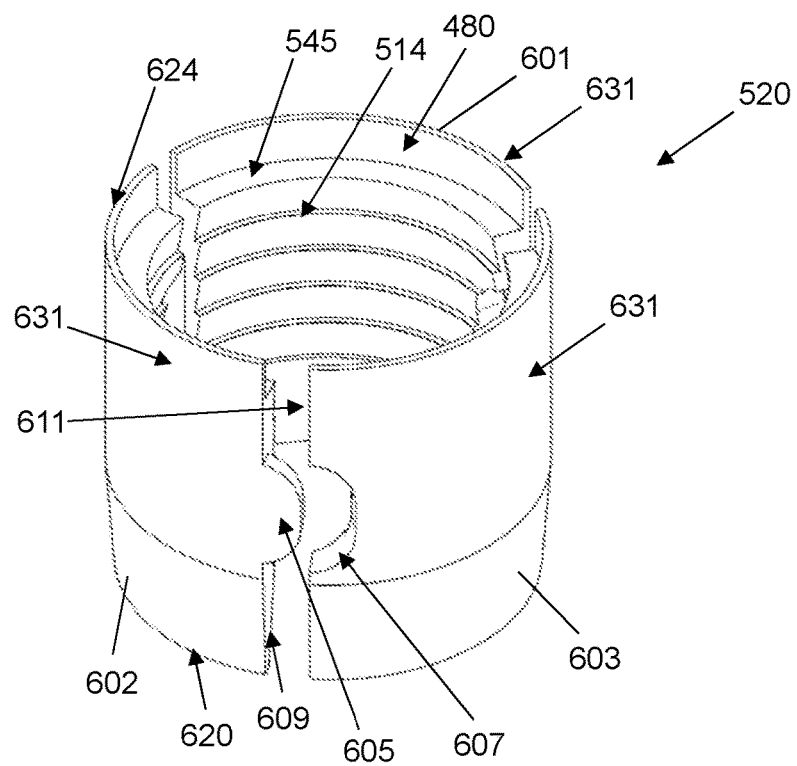
FIG. 22 is an exploded perspective view of an embodiment of a fastening device in accordance with the present disclosure.
Figure 23:
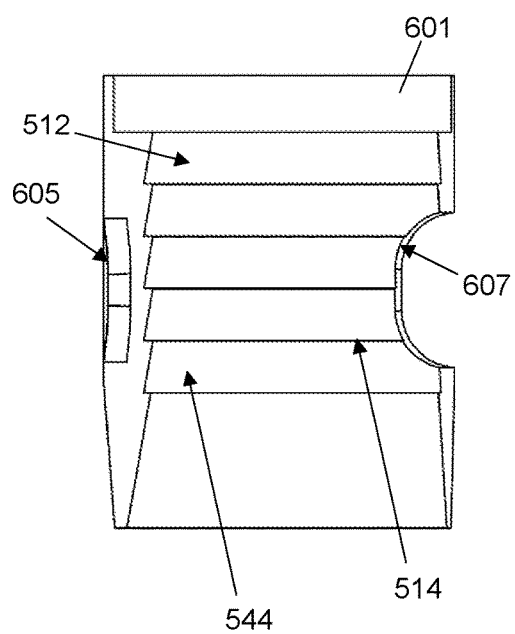
FIG. 23 is a front view of an embodiment of a fastening device member in accordance with the present disclosure.
Figure 24:
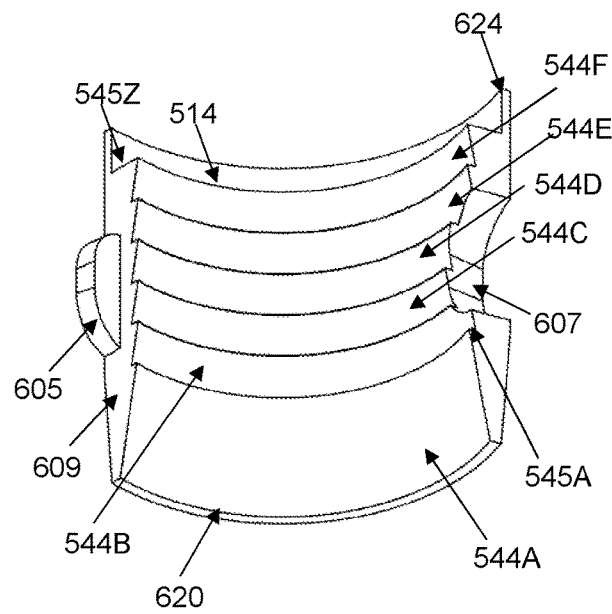
FIG. 24 is a perspective view of the fastening device member of FIG. 23.
Figure 25:
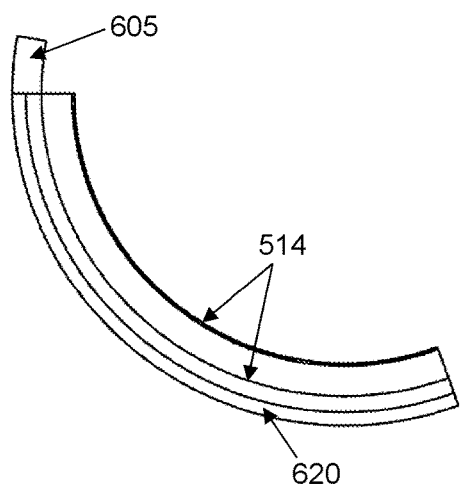
FIG. 25 is a bottom view of the fastening device member of FIG. 23.
Figure 26:
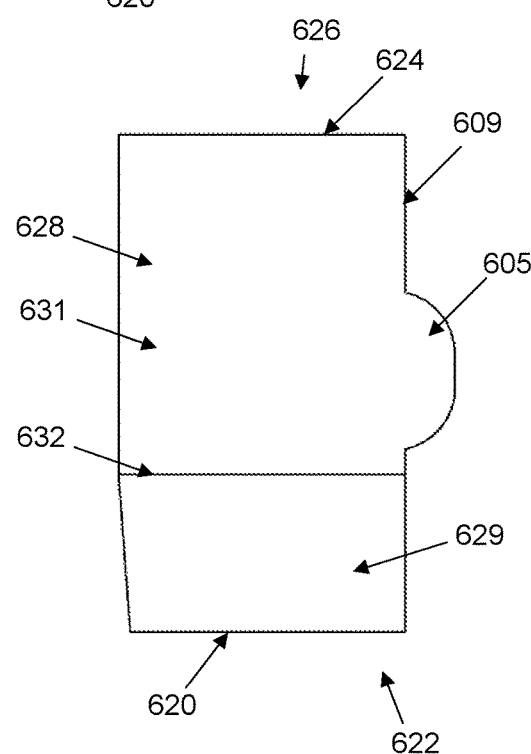
FIG. 26 is a back view of the fastening device member of FIG. 23.

In various embodiments, the radially outer surface 628 of each member 601, 602 and 603 is formed with an axially tapered segment 629 and an axially aligned segment 631, wherein the axially tapered segment 629 and axially aligned segment 631 meet at a bend 632 in the radially outer surface 628. As shown in FIGS. 17 and 21, the axially aligned segment 631 is not in contact with the barrel interior surface 522, whereas the axially tapered segment 629 is in contact with the tapered wall segment 533 of the barrel interior surface 522 when the compression member 506 is in the expanded position. This arrangement facilitates the ability for the fastening device 510 to expand as a cable or other object is inserted into the device and the compression member 506 becomes compressed, while further facilitating proper axial pressure from the compression member 506 back through the axially aligned segment 631 when the compression member 506 is expanding back to the expanded position. As shown in FIG. 22, the axially aligned segments 631 of members 601, 602 and 603 form a substantially cylindrical outer surface, which can translate the force from the compression member 506 via the substantially cylindrical retainer 508, as described more completely elsewhere herein.

As shown in FIGS. 22 through 25, the teeth 514 of fastening device 510 are formed as a series of flat surfaces (e.g., 544A-F) and generally radially inwardly extending ridges (e.g., 545A, 545F) rising from the leading edge 620 of the fastening device 510. The flat surfaces 544A-F and ridges (e.g., 545A, 545F) meet at respective teeth or sharpened edges 514 which provide for sufficient pinching ability. In various embodiments, flat surface 544A, which is closest to the leading edge 620 is the axially longest flat surface, and extends radially and axially inwardly at a pitch angle that is greater than the pitch angles extended by the remaining flat surfaces 544B-F. The higher pitch angle can help guide an inserted cable to the center of the axial opening of the fastening device, whereas the longer surface facilitates the insertion of a cable with less pinching, thereby allowing the cable to fully enter through the fastening device 510 during operation. Further, in various embodiments, ridge 545F is the radially widest ridge, which provides sufficient surface area for mating communication with retainer 508, as described elsewhere herein.

It will be appreciated that the fastening device 510 can alternatively be provided as a two-piece device with a similar arrangement to that described above and shown in FIGS. 22 through 26.

As shown in FIGS. 17 and 18, retainer 508 is formed with an axially extending body segment 562 and a radially extending head segment 560, wherein the head segment 560 has an axially inner face 564 which mates with compression member 506 during operation. The head segment 560 further has a radially outer edge 566 which slidingly engages the interior surface 522 of the barrel 502 during operation. The axially extending body segment 562 is formed with a radially outer surface 567 and an axially outer surface 568. In various embodiments, the axially outer surface 568 is in mating contact with the radially extending ridge 545Z of the fastening device 510 and the radially outer surface 567 is in mating contact with the axially aligned segment 631 of the fastening device 510. In this way, a snug connection is provided between the retaining ring 508 and the trailing edge 624 of the fastening device 510, facilitating the application of consistent force to the fastening device 510 as the compression member 506 expands from the compressed position during operation, as well as to the compression member 506 from the fastening device 510 as a cable is inserted into the fastening device 510 during operation. As shown in FIG. 18, the head segment 560 of the retaining ring 508 is in mating contact with the compression member second end 722. In various embodiments, the retainer 508 is made of a polymer plastic or steel material. In specific embodiments, the retainer 508 is formed so as to be fracturable or crushable upon a single use.

Figure 27:
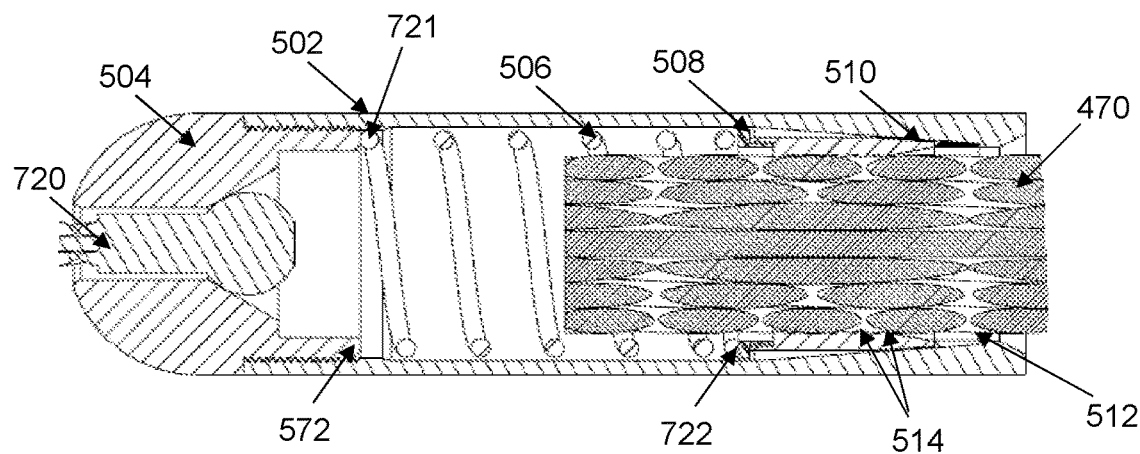
FIGS. 27-29 are cross-sectional views showing different stages of securing a cable within embodiments of the device of the present disclosure.
Figure 28:
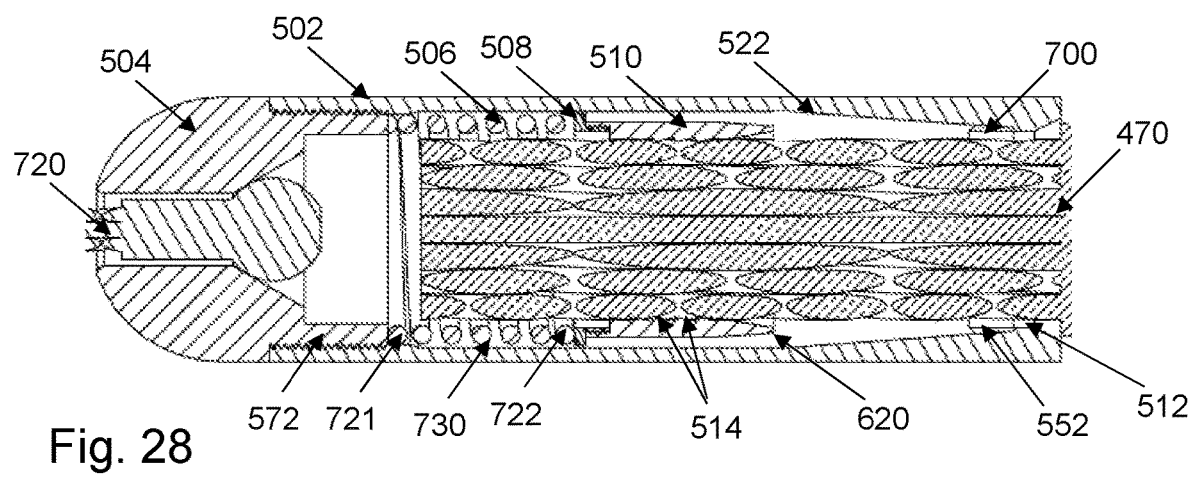
Figure 29:
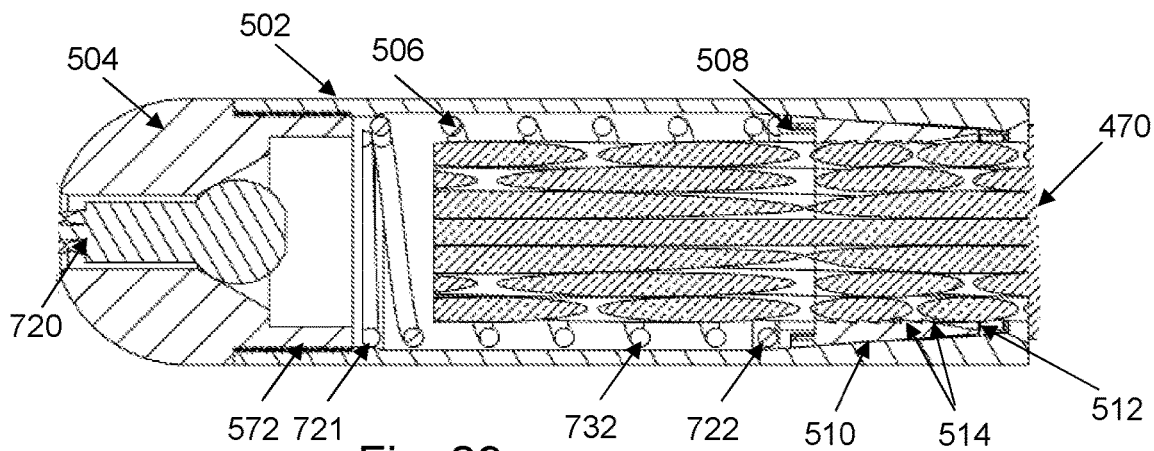
Figure 30:
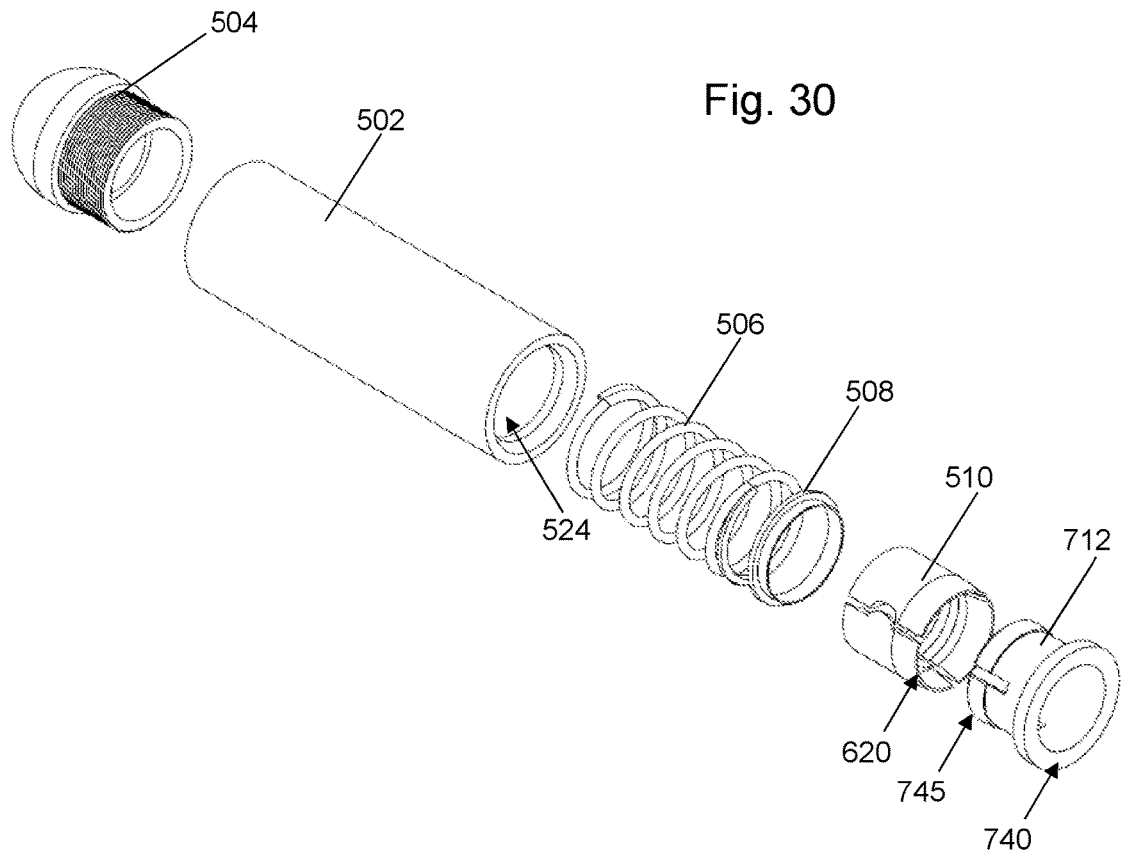
FIG. 30 is an exploded front perspective view of another embodiment of a cable securing device in accordance with the present disclosure.

In various embodiments, staging clip 512 is housed within the barrel interior cavity 524 and formed as a ring-shaped body having an exterior surface 550, an axially outer edge 551 and an axially inner edge 552. The axially inner edge 552 mates with the leading edge 620 of the fastening device 510 when the compression member 506 is in the expanded position, as shown in FIGS. 17 and 21. The axially inner edge 552 extends axially inwardly of the barrel opening and creates a gap 700 between the axially inner edge 552 and the interior surface 522 of the barrel 502 and the leading edge 620 of the fastening device 510 when the compression member is in the compressed position, as shown in FIG. 28, for example. This arrangement helps maintain the leading edge 620 of the fastening device 510 in a fully open position when the compression member is in the expanded position (as shown in FIGS. 27 and 29) so as not to block or partially block a cable as it is being inserted. The axially outer edge 551 abuts the radially outwardly extending edge 530 of the inner platform 529 for resistance when the compression member is in the expanded position. In various embodiments, the staging clip 512 is made of a polymer plastic or steel material. In specific embodiments, the staging clip 512 is formed so as to be fracturable or crushable upon a single use.

FIGS. 27 through 29 illustrate different stages of operation of the device of the present disclosure. As a cable 470 is inserted, it moves through the fastening device 510 and the retainer 508, and the fastening device teeth 514 exert a gripping force around the cable 470. The fastening device 510 is pushed axially inwardly with the retainer 508, which is in contact with the second end 722 of the compression member 506, thereby forcing compression member 506 into a compressed position as its first end 721 is retained in position by the body segment 572 of the cap 504, as shown in FIG. 28. It will be appreciated that compression member 506 is compressible into the compressed position by the trailing edge of the fastening device 510 at the compression member second end 722, even though the compression member 506 is not in direct contact with the compression member in various embodiments. As described elsewhere herein, the even surfaces of the retaining cap body segment 572 and trailing edge of the fastening device 510 provide for consistent force and/or resistance as the compression member 506 compresses and expands during operation. It will further be appreciated that as the fastening device 510 and retainer 508 are moved axially within the barrel 502, the retainer 508 slidingly engages the interior surface 522 of the barrel 502, whereas the radial outer surface 628 of the fastening device 510, and the fastening device 510 itself, are not in contact with the interior surface 522 of the barrel 502. This floating arrangement of the fastening device 510 nevertheless provides substantial gripping force on the inserted cable, as the multi-piece fastening device 510 remains intrinsically aligned via edge extensions 605 and edge notches 607 of adjacent elements while further remaining aligned within the barrel 502 via the retainer 508 and the gripping connection with the inserted cable 470. This floating arrangement further overcomes technical challenges associated with maintaining alignment of the fastening device 510 during operation, and thereby maintaining a strong grip on the inserted cable without slippage. In various embodiments, the staging clip 512 does not move axially inwardly or outwardly with the movement of the cable 470, but rather remains in place. As such, the staging clip 512 is not in mating contact with the leading edge or other portion of the fastening device 510 when the compression member 506 is in the compressed position 730. As shown in FIGS. 28 and 29, after the compression member 506 reaches its compressed position 730 and the cable 470 is inserted and secured by the fastening device 510, the compression member 506 expands back to its expanded position 732 and a previously inserted and secured lanyard 720 can then be used to pull the cable 470 in or through the desired environment.

Figure 31:
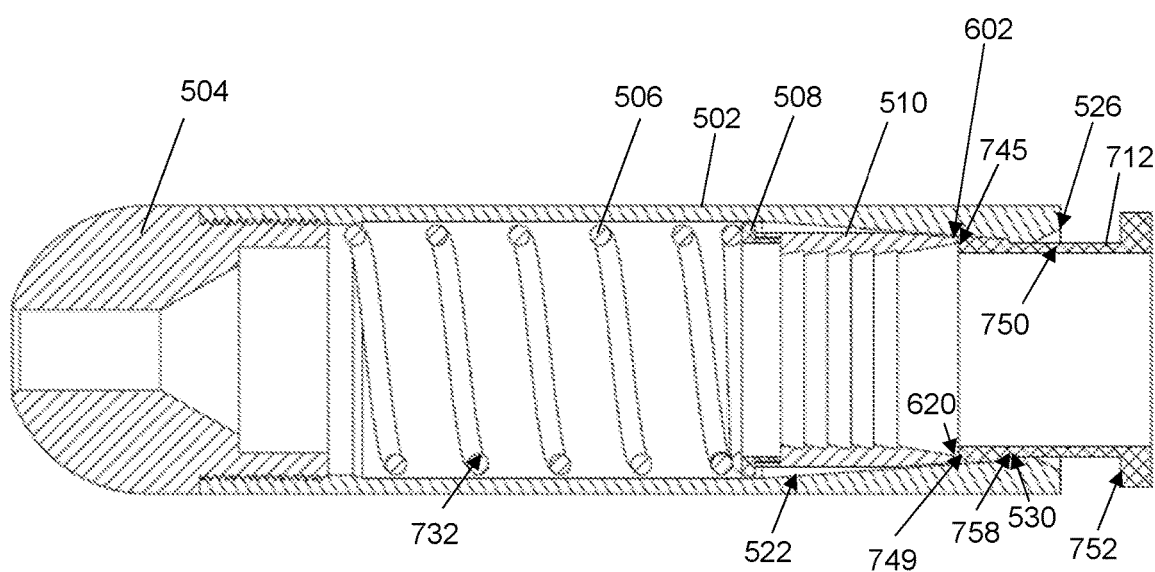
FIG. 31 is a front cross-sectional view of an assembled embodiment of the device of FIG. 30.

As shown in FIGS. 30 through 35, embodiments of the presently disclosed device employ a pusher 712 instead of a staging clip. The pusher 712 is formed with a pusher head 740 and a pusher body 742, wherein the pusher body 742 has an axially inner end 743 formed with a radially outwardly extending ledge segment 744. The pusher head 740 is outside of the barrel 502 and barrel cavity 524 during operation. The pusher 712 has a generally cylindrically-shaped cavity 747 formed by interior surface 750. The axially inner end 743 is further formed with a pusher leading edge 745. A ledge ramp 749 is formed and extends radially outwardly and axially outwardly from the leading edge 745 to an outer wall surface 751 of the ledge segment 744. The ledge ramp 749 provides a surface for engaging the leading edge 620 of the fastening device 510 and prompting the leading edge 620 into a fully open position for receiving an inserted cable, when the compression member 506 is in the expanded position (732 as shown in FIG. 31). In the installed version of the device as shown in FIG. 31, the ledge ramp 749 is radially inward of the leading edge 620 of the fastening device 510 within the barrel cavity 524. The outer wall surface 751 is formed with a taper to match the internal taper of the interior surface 522 of the barrel 502 at the residing location of the outer wall surface 751 within the barrel cavity 524.

The pusher 712 is further formed with one or more axially extending gaps 748 extending from the body 742 through the ledge segment 744 at the axially inner end 743. The gap(s) 748 create flexibility and controlled deformity of the pusher 712, such that it may be readily inserted into the cavity 524 of the barrel 502, wherein a back step 758 formed with the ledge segment 744 and extending radially outwardly of the pusher body 742 can retain the pusher 712 within the barrel cavity as the back step 758 engages the radially outwardly extending edge 530 of the inner surface 522 of the barrel 502. In various embodiments, the pusher head 740 is formed with an internal radial edge 752 that can engage the first end surface 526 of the barrel 502 during operation.

In operation of the device shown in FIGS. 30 through 35, a cable is inserted through the pusher cavity 747 and into the barrel cavity 524, where it engages and extends through the fastening device 510 and retainer 508 as described in connection with FIGS. 27 through 29 above. Whereas the staging clip 512 generally does not move axially with the cable, fastening device 510 and retainer 508 during insertion of the cable, the pusher 712 is slidingly engaged with the barrel interior surface and can move axially in the same direction as these elements. In the event of axial movement of the pusher 712, the internal radial edge 752 of the pusher head 740 may ultimately engage the first end surface 526 of the barrel 502, thereby stopping any further axial movement of the pusher 712 as the cable, compression member 506 and retainer 508 continue to move further within the barrel cavity 524. Further operation is generally as described elsewhere herein in connection with FIGS. 27 through 29.

Figure 36:
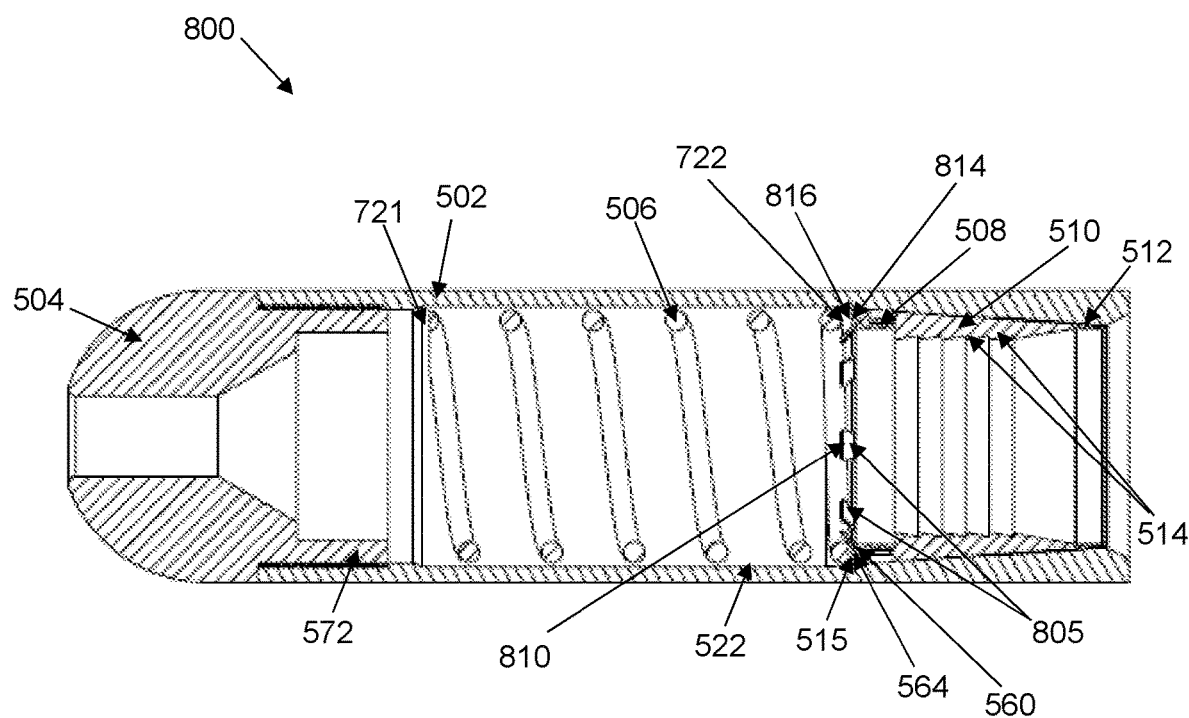
FIG. 36 is a front cross-sectional view of an assembled alternative embodiment of the device according to the present disclosure.

FIGS. 36 through 39 depict a further embodiment of the cable securing device of the present disclosure. In the device 800 according to embodiments of the present disclosure as shown in FIGS. 36 through 39, elements of the assembly as shown include: a barrel 502, a retaining cap 504, a compression member 506, a grip ring member 515, a retainer 508, a fastening device 510 and a staging clip 512. The barrel 502, retaining cap 504, compression member 506, retainer 508, fastening device 510 and staging clip 512 interoperate substantially as described above in connection with FIGS. 17 through 29. As shown in the embodiment of FIG. 36, the grip ring member 515 is positioned between the compression member 506 and the retainer 508.

As shown in FIGS. 37 through 39, the grip ring 515 has a grip ring base 801 with a radially outer edge 802 and a radially inner surface 804. The grip ring 515 can be an integral, unsplit ring or can be a split ring member. In the embodiments where the grip ring is a split ring, the grip ring can include two circumferential end points (not shown) that do not connect, with fixture points for handling and compressing the grip ring, such that a tool designed to hold the grip ring at the fixture points can more easily handle and compress the grip ring in order to assist with assembly or disassembly. In this embodiment, and once compressed, the grip ring is easily insertable into the barrel 502 by releasing the hold on the fixture points, thereby allowing the grip ring to expand such that the radially outer edge 802 engages the interior surface 522 of the barrel 502. In various embodiments, the grip ring 515 can comprise a spring steel formulation, for example, that enables the grip ring to be malformed during installation, while springing back into its originally manufactured position once installed.

The grip ring 515 is capable of grabbing an inserted cable's surface via two or more teeth 805. As shown in FIGS. 37 through 39, the grip ring 21 includes a substantially cylindrical base 801 that has a plurality of bifurcated or square edged teeth 805 extending radially inwardly from the radially inner surface 804 of the grip ring base 801. The teeth 805 of the grip ring 515 can extend at various angles from the base axis as measured when the teeth are at rest position and are not stressed by the insertion of a cable, for example. The number of teeth can readily vary in number and size. In various embodiments, the grip ring teeth 805 are angled radially and axially inwardly from the substantially cylindrical perimeter of the ring 515, toward the compression member 506 and away from the retainer 508, such that when a cable is inserted, the teeth exert a pressure against the cable to discourage the cable from slipping or moving back out of the barrel 502. The first face 814 of the grip ring 515 thus engages the axially inner face 564 of the head segment 560 of the retainer 508, while the second face 816 of the grip ring 515 engages the compression member 506, as opposed to the compression member directly engaging the head segment axially inner face 564 as described above in connection with FIG. 18, for example. In various embodiments, each of the grip ring teeth 805 is formed with side walls 812 and a gripping edge 810, wherein the gripping edge 810 extends radially inwardly into the barrel interior cavity further than the retainer 508.

In various embodiments, the grip ring 515 assists in allowing the fastening device 510 to set its teeth 514 more quickly while also preventing or minimizing any drifting of the fastening device 510 so as to slip or become unaligned, which can result in an unsatisfactory grip on an inserted cable. When a cable is inserted into the barrel 502, and similar to that described in connection with FIGS. 27 through 29, the fastening device 510 is pushed axially inwardly with the retainer 508 and the grip ring 515, which is in contact with the second end 722 of the compression member 506, thereby forcing compression member 506 into a compressed position as its first end 721 is retained in position by the body segment 572 of the cap 504. It will be appreciated that compression member 506 is compressible into the compressed position by the trailing edge of the fastening device 510 at the compression member second end 722, even though the compression member 506 is not in direct contact with the compression member as shown in FIG. 36. After the compression member 506 is compressed, the compression member 506 expands, whereupon the grip ring teeth 805 engage the inserted cable and the cable cannot slip past the grip ring teeth 805. At such time, the fastening device 510 is immediately and evenly engaged so as to remain in alignment and assist in securely engaging the inserted cable.

The invention claimed is:

1. A cable securing device, comprising:
    a barrel comprising an interior surface defining an interior cavity;
    a retaining cap secured to the barrel and comprising a body segment extending into the interior cavity of the barrel, wherein the body segment comprises a radially extending edge;
    a compression member maintained within the barrel interior cavity between an expanded position and a compressed position, wherein the compression member comprises first and second ends;
    a fastening device axially movable within the barrel interior cavity, wherein the fastening device comprises a leading edge at a first axial end, a trailing edge at a second axial end and a radially interior surface comprising a gripping segment; and
    a staging clip housed within the barrel interior cavity and in mating contact with the leading edge of the fastening device when the compression member is in the expanded position;
    wherein the compression member is compressible into the compressed position by the radially extending edge of the retaining cap body segment at the compression member first end and by the trailing edge of the fastening device at the compression member second end.

2. The cable securing device of claim 1, wherein the staging clip is not in mating contact with the leading edge of the fastening device when the compression member is in the compressed position.

3. The device of claim 1, wherein the fastening device comprises a plurality of joined independent fastening devices slidingly engaged with the interior surface of the barrel when the compression member is in the expanded position.

4. The device of claim 3, wherein each of the plurality of independent fastening devices comprises a first side edge and a second side edge, wherein the first side edge comprises an edge extension extending outwardly thereof, and wherein the second side edge is formed with an edge notch extending inwardly thereof.

5. The device of claim 1, wherein the fastening device comprises a radially outer surface, and wherein the radially outer surface at the first axial end of the fastening device is not engaged with the barrel interior surface when the compression member is in the compressed position.

6. The device of claim 1, wherein the fastening device comprises a radially outer surface, and wherein the radially outer surface at the second axial end of the fastening device is not engaged with the barrel interior surface when the compression member is in the compressed position.

7. The device of claim 1, wherein the fastening device comprises a radially outer surface, and wherein the radially outer surface at the first and second axial ends of the fastening device is not engaged with the barrel interior surface when the compression member is in the compressed position.

8. The device of claim 1, wherein the fastening device comprises a radially outer surface, and wherein the radially outer surface at the second axial end of the fastening device is not engaged with the barrel interior cavity when the compression member is in the expanded position.

9. A cable securing device, comprising:
a barrel comprising an interior surface defining an interior cavity;
a retaining cap secured to the barrel and comprising a body segment extending into the interior cavity of the barrel, wherein the body segment comprises a radially extending edge;
a compression member maintained within the barrel interior cavity between an expanded position and a compressed position, wherein the compression member comprises first and second ends;
a fastening device axially movable within the barrel interior cavity, wherein the fastening device comprises a leading edge at a first axial end, a trailing edge at a second axial end and a radially interior surface comprising a gripping segment; and
a pusher slidingly engaged with the barrel interior surface and in mating contact with the leading edge of the fastening device when the compression member is in the expanded position;
wherein the compression member is compressible into the compressed position by the radially extending edge of the retaining cap body segment at the compression member first end and by the trailing edge of the fastening device at the compression member second end.

10. The cable securing device of claim 9, wherein the pusher comprises a head portion positioned axially outside of the barrel.

11. The cable securing device of claim 9, wherein the compression member is compressible into the compressed position by the radially extending edge of the retaining cap at the compression member first end and by the trailing edge of the fastening device at the compression member second end.

12. The cable securing device of claim 9, wherein the fastening device comprises a plurality of joined independent fastening devices, wherein each of the plurality of joined independent fastening devices comprises a first side edge and a second side edge, wherein the first side edge comprises an edge extension extending outwardly thereof, and wherein the second side edge is formed with an edge notch extending inwardly thereof.

13. The cable securing device of claim 9, wherein the gripping segment comprises a plurality of teeth, wherein each of the plurality of teeth comprises a radially inwardly extending ridge and an axially and radially outwardly extending face, wherein the axially outermost of the plurality of teeth comprises a face that is of greatest length among the plurality of teeth.

14. The cable securing device of claim 9, further comprising a grip ring maintained within the internal cavity by the compression member and the retaining ring.

15. The cable securing device of claim 14, wherein the grip ring comprises a ring-shaped body and a plurality of radially inwardly extending teeth.

16. The cable securing device of claim 9, wherein the fastening device comprises a plurality of joined independent fastening devices slidingly engaged with the interior surface of the barrel when the compression member is in the expanded position.

17. The cable securing device of claim 16, wherein each of the plurality of independent fastening devices comprises a first side edge and a second side edge, wherein the first side edge comprises an edge extension extending outwardly thereof, and wherein the second side edge is formed with an edge notch extending inwardly thereof.

18. The cable securing device of claim 9, wherein the fastening device comprises a radially outer surface, and wherein the radially outer surface at the first axial end of the fastening device is not engaged with the barrel interior surface when the compression member is in the compressed position.

19. The cable securing device of claim 9, wherein the fastening device comprises a radially outer surface, and wherein the radially outer surface at the second axial end of the fastening device is not engaged with the barrel interior surface when the compression member is in the compressed position.

20. The cable securing device of claim 9, wherein the fastening device comprises a radially outer surface, and wherein the radially outer surface at the first and second axial ends of the fastening device is not engaged with the barrel interior surface when the compression member is in the compressed position.

* * * * *